Nov. 25, 1947.   C. R. ATHY   2,431,532
METHOD OF PRODUCING JARS FOR WELL DRILLING TOOLS
Filed May 18, 1945
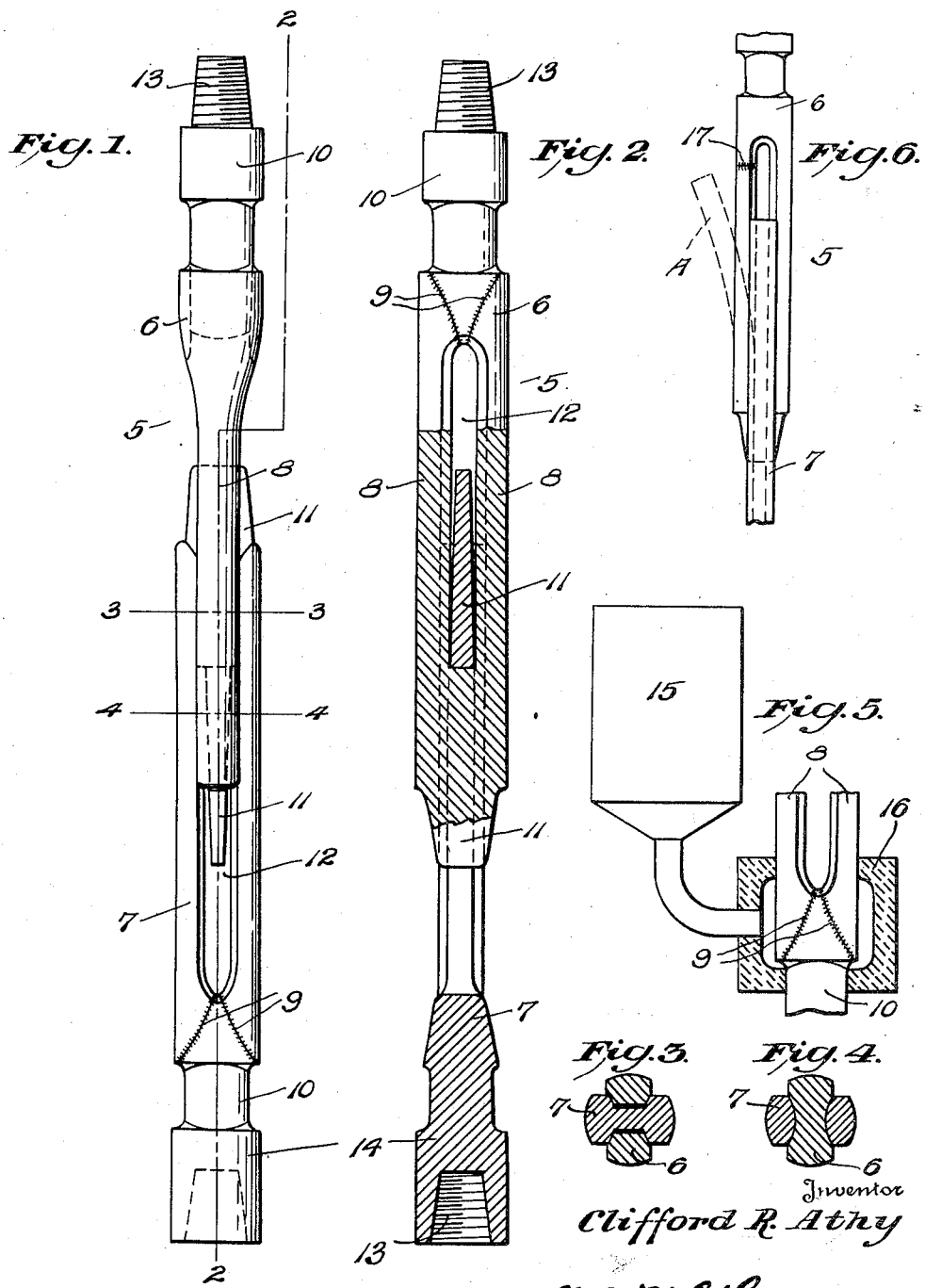
Inventor
Clifford R. Athy
By W. I. McDowell
Attorney Patented Nov. 25, 1947

2,431,532

UNITED STATES PATENT OFFICE 2,431,532

METHOD OF PRODUCING JARS FOR WELL DRILLING TOOLS

Clifford R. Athy, Columbus, Ohio, assignor to International Derrick & Equipment Company, Columbus, Ohio, a corporation of Ohio Application May 18, 1945, Serial No. 594,534

4 Claims. (Cl. 76—101)

This invention relates to a method of producing drilling and fishing jars of the type employed in strings of cable operated tools used in the drilling of underground wells.

In such an operation, it is customary to use a string of tools connected with the lower end of an operating cable, and consisting of a drilling bit, a stem, a set of jars and a rope socket, all threadedly united and assembled in axially aligned order. The jars used in such a string of tools comprise a pair of interconnected link elements having limited sliding movement relative to each other, so that impact forces may be sharply applied to the tool string for the purpose of jerking the bit and freeing the same in the event it should lodge in the rock or other formation undergoing drilling.

In general, drilling jars are of two types: first, the welded jar and, second, the weldless jar. The welded jar is less expensive to produce, although its operating life is shorter than that of the weldless jar. This is due to the fact that the slidable elements of the weldless jar are formed originally from one body of metal which, through a forging process, is fashioned to produce the two interconnected sliding elements. Since it is devoid of welded unions, the weldless jar may be heat treated and tempered, so that it possesses a hardness considerably in excess of that which can be given the ordinary welded jar, hence its longer operating life.

In the welded jar, each of the elements thereof is formed to comprise a boxing composed of screw threaded end members of machinable low-carbon steel (0.17 C) and which are hammer welded to the adjoining upper and lower end of the guide reins of the jar, the reins being formed from a high carbon steel (0.60 C) to provide somewhat higher resistance to impact forces. Such a high carbon steel can not be welded satisfactorily with electrical equipment and, consequently, the welds are formed by pressing or hammering the heated contiguous ends of the reins to the end members. Such a hammered weld is seldom perfect, since voids are usually found therein. Moreover, a hammered weld can not be satisfactorily heat treated for hardness, as the quenching and tempering steps in such an operation are quite likely to create high internal stresses, causing the welds to rupture under operating conditions.

Therefore, it is an object of the present invention to provide an improved welded jar, and method of producing the same, by which the jar may be heat treated to a high degree of hardness without suffering impairment, so that its useful life will be comparable with and in certain respects superior to that of the weldless or one-piece jar.

Another object of the invention is to provide a welded jar in which the reins thereof are welded through a thermit operation, whereby welds are provided capable of withstanding steel hardening operations without structural deterioration or impairment.

A further object is to provide a jar which by use of thermit welding requires but a single weld instead of the multiple welds of prior practice.

For a further understanding of the invention, reference is to be had to the following description and the accompanying drawing, wherein:

Fig. 1 is a side elevational view of a drill jar formed in accordance with the present invention;

Fig. 2 is a vertical sectional view on the line 2—2 of Fig. 1;

Fig. 3 is a transverse horizontal sectional view on the line 3—3 of Fig. 1;

Fig. 4 is a similar view on the line 4—4 of Fig. 1;

Fig. 5 is a detail sectional view disclosing the jar with a thermit mold applied to the weldless joint thereof;

Fig. 6 is a detail view disclosing a jar element having but a single weld.

Referring to the drawing, the numeral 5 designates the drilling jar in its entirety. The complete jar comprises a pair of upper and lower virtually duplicative link elements 6 and 7, respectively. Each element includes a boxing consisting of guide reins 8 which at one end of the jar are welded as at 9 to the body of an end member 10, while the opposite ends of said reins are formed with an integral transverse web or knocking head 11, the latter being slidably received in a slot 12 formed between each pair of said reins.

As previously indicated, the end members 10 are composed of a relatively low carbon content steel, which renders the same readily machinable so that they may be screw threaded as at 13 for association with a rope socket or the stem elements of a string of drilling tools. It is also advisable that the end members should not possess a high degree of hardness as they do in the weldless type of jar, since, when excessively hardened, the threaded pin or extension 14 provided on one of said end members, tends to fracture at its base or lower end under the constant jarring or impact forces applied thereto in the operation of the tool string. The guide reins are formed from a high carbon steel, such as 0.60, which does not lend itself to electrical welding. Consequently, the welds 9 in the standard welded jar are of the hammered type, the welds being necessitated in the assembling of the complete jar and also to permit of the employment of different types of steels in the reins and end member construction.

In accordance with the present invention, the welds are produced by the thermit process of casting superheated thermit steel around the joints to be united. As is well known, thermit is a mixture of finely divided aluminum and iron oxide. This mixture is placed in a crucible, indicated generally at 15, and the steel is produced by igniting the thermit, which generates the heat necessary to start the intense exothermic chemical reaction. As soon as the reaction ceases, the steel sinks to the bottom of the crucible and is conducted to one or more molds 16 which are removably applied to the jar parts to be welded. As the temperature of the steel is about 5400° F., it fuses and amalgamates with the separated sections, joining the same in the form of homogeneous welds.

With the use of the thermit welds, any steel, such as high or low carbon of various special alloy steels, can be heat treated by customary procedures in obtaining the required or desired hardness of the metal. The same degree of hardness, therefore, may be imparted to my improved welded jar as is now usually given to the weldless type of jar. By these operations, a hardened steel welded jar may be produced which will possess a long operating life with relatively low manufacturing costs.

In lieu of employing the multiple welds, disclosed in Figs. 1 and 2, I have found it feasible with the thermit weld to merely weld the jar element at one place, as indicated at 17 in Fig. 6. By heat treating the jar element, the severed rein is bent laterally and outwardly, as disclosed at A in dotted lines. With the reins so outwardly bent, the head or web of the complemental jar element may be inserted thereover to assume proper link-establishing relationship. With the elements so joined, the bent rein is forced back to its original position, as in full lines in Fig. 6, and through the thermit welding operation is reunited with the body of the element. While in this form of my invention, the welding operations are simplified, nevertheless, it does not admit of the employment of different steels at the ends of the jar element as compared with the rein construction and, as previously stated, it is advantageous to use a more ductile steel in the screw threaded ends of the jar element.

I claim:

1. The method of producing a jar for well-drilling tools wherein the jar is formed with a body having side reins, which comprises severing the side rein of such a jar element and bending the same to a position whereby it will receive a slidable complemental jar element, restoring the bent side rein to its normal position to retain the complemental jar element therein, and thermit welding the severed side rein to unite the same homogeneously with the adjoining body region of the element.

2. The method of producing a jar for well-drilling tools wherein the jar is formed with a body having side reins, which comprises severing the side rein of such a jar element and bending the same to a position whereby it will receive a slidable complemental jar element, restoring the bent side rein to its normal position to retain the complemental jar element therein, thermit welding the severed side rein to unite the same homogeneously with the adjoining body region of the element, and thereafter heat-treating and hardening the united jar elements.

3. The method of producing a jar for well-drilling tools wherein the jar is composed of threaded end members of low carbon steel and side reins of high carbon steel, the step which comprises fusing and amalgamating the ends of said reins with said end members by thermit welding.

4. The method of producing a jar for well-drilling tools, in which the jar is formed to embody end members composed of a steel relatively low in its carbon content and with spaced reins uniting the end members and formed from a steel of substantially higher carbon content than that of which the end members is composed, which comprises uniting the reins at their ends with contiguous portions of said end members by a thermit welding operation, and thereafter subjecting the welded jar to heat-treating operations to increase the hardness thereof.

CLIFFORD R. ATHY.

REFERENCES CITED

The following references are of record in the file of this patent:

UNITED STATES PATENTS

| Number | Name | Date |
|---|---|---|
| 66,816 | Eastman | July 16, 1867 |
| 369,726 | Lloyd | Sept. 13, 1887 |
| 1,541,911 | Armour | June 16, 1925 |
| 1,587,022 | Montgomery | June 1, 1926 |
| 1,637,511 | Arbon | Aug. 2, 1927 |
| 1,725,842 | Arbon | Aug. 27, 1929 |

FOREIGN PATENTS

| Number | Country | Date |
|---|---|---|
| 202,121 | Great Britain | Aug. 16, 1923 |